US008934910B2

United States Patent
Lee et al.

(10) Patent No.: US 8,934,910 B2
(45) Date of Patent: Jan. 13, 2015

(54) APPARATUS AND METHOD FOR DISCOVERING CLOSED SUBSCRIBER GROUP TERMINAL IN FEMTO CELL

(75) Inventors: Jin Lee, Gyeonggi-Do (KR); Yongho Kim, Gyeonggi-Do (KR); Kiseon Ryu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 182 days.

(21) Appl. No.: 12/973,502

(22) Filed: Dec. 20, 2010

(65) Prior Publication Data

US 2011/0151859 A1 Jun. 23, 2011

Related U.S. Application Data

(60) Provisional application No. 61/288,794, filed on Dec. 21, 2009.

(30) Foreign Application Priority Data

Nov. 22, 2010 (KR) .................. 10-2010-0116458

(51) Int. Cl.
*H04W 36/00* (2009.01)
*H04W 48/02* (2009.01)
*H04W 84/04* (2009.01)

(52) U.S. Cl.
CPC ............ *H04W 48/02* (2013.01); *H04W 84/045* (2013.01)
USPC ........... 455/444; 455/449; 455/448; 455/443; 455/438

(58) Field of Classification Search
USPC .................. 455/449, 444, 448, 438, 443
See application file for complete search history.

(56) References Cited

U.S. PATENT DOCUMENTS

| 2009/0264126 | A1 | 10/2009 | Khetawat et al. | |
|---|---|---|---|---|
| 2009/0270096 | A1* | 10/2009 | Somasundaram et al. | 455/434 |
| 2009/0305699 | A1 | 12/2009 | Deshpande et al. | |
| 2010/0056160 | A1* | 3/2010 | Kim et al. | 455/444 |
| 2010/0111047 | A1* | 5/2010 | Yang et al. | 370/336 |
| 2011/0111757 | A1* | 5/2011 | Venkatachalam et al. | 455/435.2 |
| 2012/0015649 | A1* | 1/2012 | Li et al. | 455/434 |

FOREIGN PATENT DOCUMENTS

EP 2117261 A1 11/2009
KR 10-2006-0109216 A 12/2008

OTHER PUBLICATIONS

U.S. Appl. No. 61/259,086, filed Nov. 2009, Bergman et al.*

* cited by examiner

*Primary Examiner* — Patrick Edouard
*Assistant Examiner* — Chuck Huynh
(74) *Attorney, Agent, or Firm* — Birch, Stewart, Kolasch & Birch, LLP (57) ABSTRACT

A method for operating an overlay macro base station (BS) for discovering a closed subscriber group (CSG) user equipment (UE) in a femto cell, includes: receiving a ranging request message including a CSG ID information from a UE which attempts a network entry; and after receiving the ranging request message from the UE, recommending the femto cell to monitor uplink signaling of a CSG UE belonging to the overlay macro BS.

14 Claims, 5 Drawing Sheets

APPARATUS AND METHOD FOR DISCOVERING CLOSED SUBSCRIBER GROUP TERMINAL IN FEMTO CELL

CROSS-REFERENCE

The present application claims priority benefit to the following applications, which contents are all incorporated by reference herein: U.S. Provisional Application No. 61/288,794 (filed Dec. 21, 2009), and Korean Patent Application No. 10-2010-0116458 (filed Nov. 22, 2010).

TECHNICAL FIELD

The present invention relates to a femto cell in a wireless access system and, more particularly, to a method and apparatus for discovering a closed subscriber group (CSG) terminal in a femto cell.

BACKGROUND ART

A femto cell will be described in brief as follows.

Femto is a prefix in the metric system denoting a factor of 10-5. In this context, a femto cell refers to an indoor base station which is very small, consumes small power, and is used at homes or in the offices. The femto cell is used to have a meaning similar to a picocell, but it is generally admitted to have an evolved function.

The femto cell may be also called a femto base station (FBS) or a femto base transceiver station (BTS).

The femto BS, which is a small version of a macro base station and performs a majority of the functions of the macro base station, may be installed in an area covered by the macro base station or may be installed in a shadow area not covered by the macro base station. The femto base station has an independently operating network constitution and a far larger number of femto base stations than relay base stations may be installed in downtown areas or indoor areas.

The femto cell has the following advantages.

1. A cell coverage improvement
2. Infrastructure cost decrease
3. New service offering
4. Fixed mobile convergence (FMC) acceleration One or more femto cells may be grouped by particular services or areas to constitute a femto cell group. For example, a femto cell group allowing only a particular terminal to access may be called a closed subscriber group (CSG). The femto BS checks a CSG identifier (CSG ID) of a terminal and allows only a terminal, which has subscribed to the CSG, to access.

Figure 1:
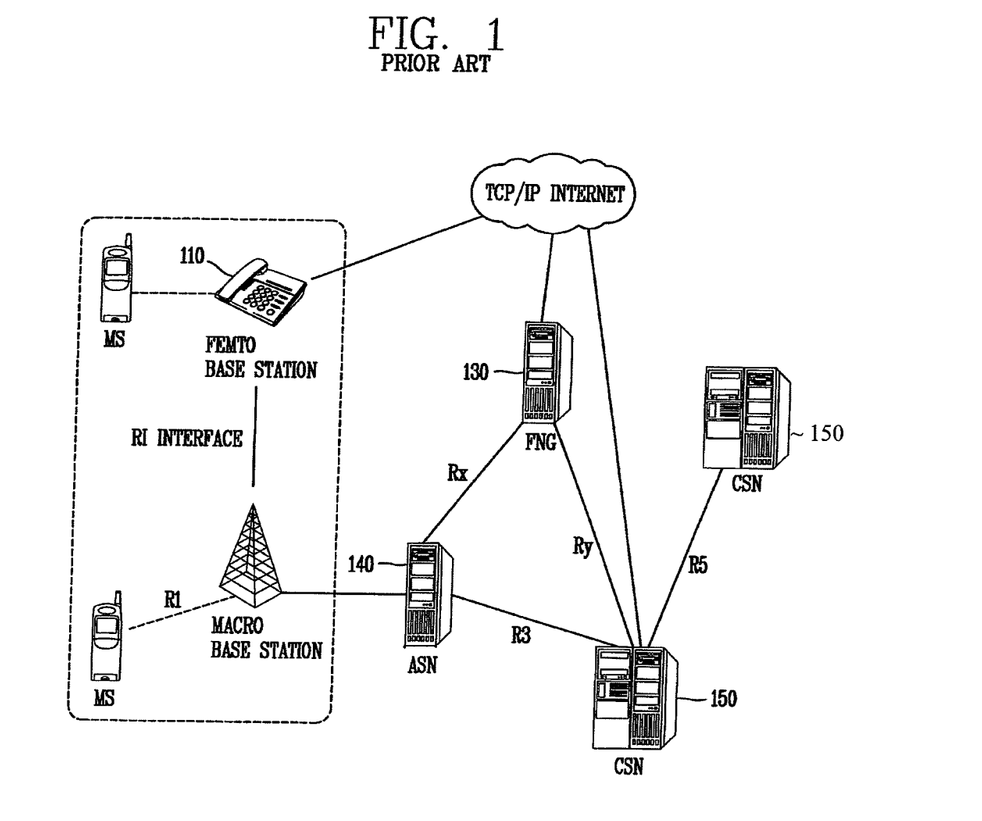
FIG. 1 is a view illustrating a wireless communication system additionally including a femto base station (BS)

FIG. 1 is a view illustrating the configuration of a wireless communication system including a femto BS.

As shown in FIG. 1, the wireless communication system including a femto BS may include a femto BS 110, a macro BS, a femto network gateway (FNG) 130, an access service network (ASN) 140, and at least one connectivity service network (CSN) 150. The macro BS refers to a general BS of the related art wireless communication system. The ASN 140 and CSN 150 may be connected by a link R3. Multiple CSNs may be connected by a link R5.

The femto BS 110 is on the premise that it directly accesses a TCP/IP (Transmission Control Protocol/Internet Protocol) network to independently operate like a macro BS and has a coverage ranging from 0.1 m to 30 m. One femto BS 110 is assumed to accommodate ten to twenty UEs. The femto BS 110 may use the same frequency as that of the macro BS (in case of Intra FA) or may use a different frequency (In case of Inter FA).

The femto BS 110 may be connected to the macro BS through an R1 interface to receive a downlink channel from the macro BS, or may transmit a control signal to the macro BS.

The femto BS 110 may cover an indoor area or a shadow area not covered by the macro BS and may be able to support a high data transmission rate. The femto BS 110 may be installed in an overlay manner within a macro cell or may be installed in a non-overlay manner in an area not covered by the macro BS. The femto BS 110 is classified into two types of femto BSs.

The first type of femto BS is a closed subscriber group (CSG) femto BS, and the second type of femto BS is an open subscriber group (OSG) femto BS. The CSG femto BS groups UES accessible thereto and gives a CSG ID (Identification) to the UEs, thus discriminating the UEs which have been assigned the CSG ID and UEs which are otherwise when the UEs access the CSG femto cell BS. The OSG femto cell BS is a BS allowing every UE to access.

The FNG 130 is a gateway that controls the femto BS 110, which is connected to the ASN 140 and the CSN 150 through an Rx interlace and an Ry interlace. The femto BS 110 may receive a service from the CSN 150 through the FNG 130, and a UE connected to the femto BS 110 may receive a service of a function such as authentication, IMS, and the like, from the FNG 130 of the CSN 150.

The CSN 150 may provide a connection of an application service such as the Internet, VoIP, and the like, to the UE and provide an authentication and billing (or charging) function, and the ASN 140 may control the macro BS and manage a connection between the macro BS and the CSN 150.

Meanwhile, the foregoing CSG type femto BS may be classified into two types of femto BSs according to the possibility of a connection of a non-member UE, namely, a UE which has not assigned the CSG ID.

Namely, a CSG closed femto ABS is a type of BS allowing only member UE to access. The UE may store CSG closed femto BS IDs allowing for its connection in a white list.

Meanwhile, a CSG open femto ABS preferentially supports a service of member UEs, and when there is leeway in the resources, the CSG open femto ABS allows non-member UEs to access. In this case, however, a service level with respect to the non-member UEs may be discriminated over the member UEs.

Currently, the mobile communication system using a femto BS is on the premise that the two types of femto BSs as to whether non-member UEs are allowed for accessing are fixed as described above with respect to the CSG type femto BS, and the differentiation of the CSG open/closed femto BSs may be recognized through partition information in an AAI_SCD (Advanced Air Interface System Configuration Descriptor) message.

Meanwhile, when the macro BS and the femto BS are installed in the same frequency domain, non-member CSG UEs connected to the macro BS may be affected by interference from neighboring femto BSs. In this case, the macro BS may not allow the corresponding femto BS not to use a certain resource domain, thus adjusting the interference to the UEs.

Figure 2:
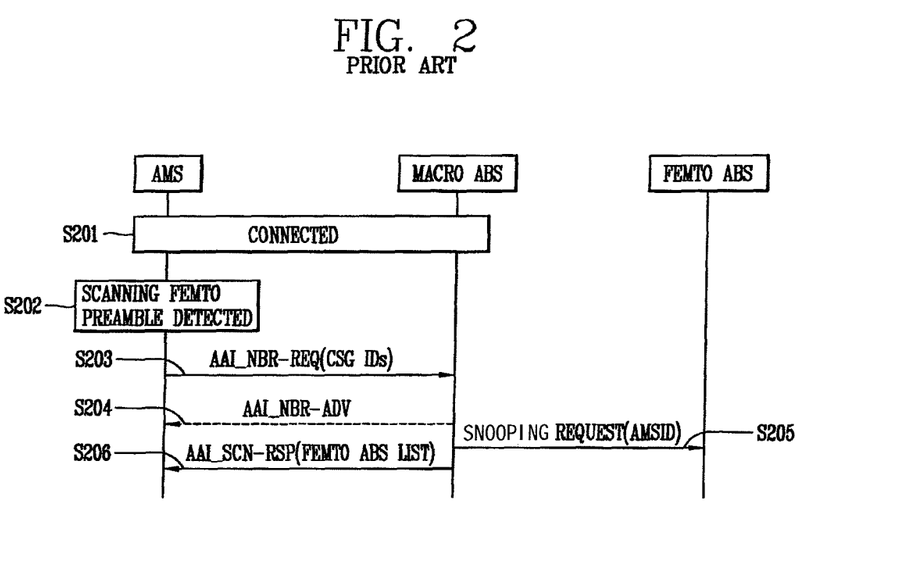
FIG. 2 is a flow chart illustrating the process of instructing, by a macro BS, femto cells to perform snooping according to the related art.

FIG. 2 is a flow chart illustrating the process of instructing, by the macro BS, femto cells to perform snooping according to the related art.

First, in a state in which the UE is connected to the macro BS (step S201), namely, after the UE performs a network entry toward the macro BS, it performs initial scanning (step S202).

When a femto preamble is detected according to the scanning performing results of the UE, the UE transmits an AAI_NBR-REQ message to the macro BS in order to request information regarding a neighbor BS (step S203).

In this case, when the UE stores the CSG ID in CSG white list, it may deliver the CSG ID together to request an accessible neighboring femto list.

The UE may receive a neighbor advertisement message (AAI_NBR-ADV message) from the macro BS in response to the NBR-REQ message (step S204).

When the NBR-REQ message is received from the UE, the macro BS may instruct femto BSs corresponding to the CSG ID to perform snooping through a backbone network (step S205).

Here, snooping refers to a method of allowing a femto BS to eavesdrop an uplink signal of the UE allowed to access the femto BS to thus recognize the UE by the femto BS.

The UE ID is included in the message instructing the snooping, so the femto BS can recognize the UE to be eavesdropped.

When a signaling value received from an adjacent UE is higher than a threshold value, the femto BS respond accordingly to the macro BS through a report.

Next, the macro BS may deliver a list of femto ABSs to be scanned (including a list of CSG femto BSs allowed for the UE's access) to acquire additional information to the UE through a nonsolicited scan response (unsolicited AAI_SCN-RSP) message (step S206).

In the related art as described above with reference to FIG. 2, when the UE detects a femto preamble, it can recognize the presence of a femto BS nearby, but it cannot ascertain whether or not the femto BS belongs to a CSG of the UE so the femto BS is allowed for the UE to access until when it obtains additional information such as BSID or a CSGID of the corresponding femto BS.

Thus, if the process of acquiring, by the BS, the list of femto BSs corresponding to the CSG ID through a network is additionally performed, it would take much time for the UE to discover a femto BS because the points in time when the AAI_NBR-REQ message or the AAI_SCN-REQ message is transmitted and the AAI_SCN-RSP message is received are delayed.

Namely, the terminal is anticipated to perform initial scanning when scanning conditions are met, and after the CSG ID is delivered through the NBR-REQ message, the macro BS will instruct snooping to instruct macro BS initiated handover (HO).

Namely, snooping of the femto BS may not start until the UE delivers the AAI_NBR-REQ or the AAI_SCN-REQ including the CSG ID (namely, after the UE already discovers the femto BS), so delay may occur until when the UE actually detects the femto BS.

DISCLOSURE OF THE INVENTION

Therefore, an object of the present invention is to provide a method and apparatus for discovering a CSG UE in a femto cell. Specifically, an object of the present invention is to advance a point in time when a femto cell discovers a member UE allowed to access the femto cell by transmitting a closed subscriber group identifier (CSG ID(s)) to a macro BS during a network entry process.

To achieve these and other advantages and in accordance with the purpose of the present invention, as embodied and broadly described herein, there is provided a method for operating an overlay macro base station (BS) for discovering a closed subscriber group (CSG) user equipment (UE) in a femto cell, including: receiving a ranging request message including a CSG ID information from a UE which attempts a network entry; and after receiving the ranging request message from the UE, recommending the femto cell to monitor uplink signaling of a CSG UE belonging to the overlay macro BS.

The method may further include: selecting a femto cell which can be accessed by the CSG terminal on the basis of the CSG ID received from the UE.

The selected femto cell may be a femto cell located near the UE.

The selected femto cell may be recommended to monitor uplink signaling of the CSG UE belonging to the overlay macro BS.

When no femto cell has been selected, monitoring of uplink signaling of the CSG UE belonging to the overlay macro BS may not be recommended.

In the recommending of monitoring uplink signaling of the CSG UE, information for identifying the CSG UE to be monitored by the femto cell may be transmitted to the femto cell.

The femto cell may be a CSG femto cell within the overlay macro BS.

The UE may be a femto preference UE which preferentially attempts a network entry toward the femto cell.

To achieve these and other advantages and in accordance with the purpose of the present invention, as embodied and broadly described herein, there is also provided a method for operating a user equipment (UE) within an overlay macro base station (BS) in order to discover a closed subscriber group (CSG) user equipment (UE) in a femto cell, including: transmitting a ranging request message including CSG ID information to the overlay macro BS in order to attempt a network entry toward the overlay macro BS; and receiving a ranging response message in response to the ranging request message from the overlay macro BS.

The femto cell may be within the overlay macro BS, and may be a CSG femto cell located near the UE.

The UE may be a femto preference UE which preferentially attempts a network entry toward the femto cell.

To achieve these and other advantages and in accordance with the purpose of the present invention, as embodied and broadly described herein, there is also provided an overlay macro base station (BS) for discovering a closed subscriber group (CSG) user equipment (UE) in a femto cell, including: a reception unit configured to receive a ranging request message including a closed subscriber group identifier (CSG ID) from a UE that attempts a network entry; a transmission unit configured to transmit the identification information of the UE to the femto cell to allow the femto cell to monitor uplink signaling of the CSG UE belonging to the overlay macro BS; and a controller configured to select at least one femto cell which the CSG UE can access on the basis of the CSG identification information received from the UE, and control the transmission unit to transmit the identification information of the UE to the selected femto cell.

According to exemplary embodiments of the present invention, when a CSG terminal that prefers a connection to a femto BS stores base station information (e.g., CSGID or BSID) to which the CSG terminal has subscribed, the CSG terminal may transmit the information regarding the subscribed base station during a network entry process with the overlay macro base station, thus advancing a point in time when the overlay macro base station instructs CSG femto BSs to perform snooping. Therefore, time taken for the femto BSs to discover the subscribed terminal can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

Exemplary embodiments of the present invention will now be described in detail with reference to the accompanying drawings. Only the parts required for understanding the operation according to the present invention will be described, and in the description of the present invention, detailed explanations of related art are omitted when it is deemed that they may unnecessarily obscure the essence of the present invention.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

The exemplary embodiments of the present invention are described based on the relationship of data transmission and reception between a base station (BS) and a terminal. Here, the BS refers to a terminal node of a network directly communicating with the terminal. A particular operation described to be performed by the BS in this document may also be performed by an upper node of the BS according to circumstances.

Namely, it is obvious that various operations performed for communication with the terminal in a network including a plurality of network nodes including the BS are performed by the BS or network nodes other than the BS. The BS may be referred to by other names such as fixed station, Node B, eNode B (eNB), access point, and the like. Also, the terminal may be referred to by other names such as user equipment (UE), mobile station (MS), mobile subscriber station (MSS), and the like.

The exemplary embodiments of the present invention may be implemented through various means. For example, the exemplary embodiments of the present invention may be implemented by hardware, firmware, software, and any of their combinations.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, methods according to exemplary embodiments of the present invention may be implemented in the form of modules, procedures, functions, and the like, performing the functions and operations as described above. A software code may be stored in a memory unit and driven by a processor. The memory unit may be positioned within or outside the processor and transmit and receive data to and from the process through various already known means.

The terms used in the present application are merely used to describe particular embodiments, are not intended to limit the present invention, and may be modified into a different form within the scope of the present invention.

A method for advancing a point in time when a macro BS instructs femto cells to perform snooping according to exemplary embodiments of the present invention will now be described.

Preferably, the snooping operation of a femto BS starts due to an overload when certain conditions are met or according to a request from the macro BS, and in the present disclosure, it is assumed that the snooping operation starts according to a request from the macro BS.

First Embodiment

The first embodiment provides a method of including a CSG ID(s) in an RNG-REQ message and transmitting the same, when the terminal (or UE) performs network entry toward an overlay macro BS.

Namely, the first embodiment provides the process of transmitting the CSG ID through an AAI_RNG-REQ when the femto preferred terminal (AMS) performs a network entry toward the overlay macro BS.

Figure 3:
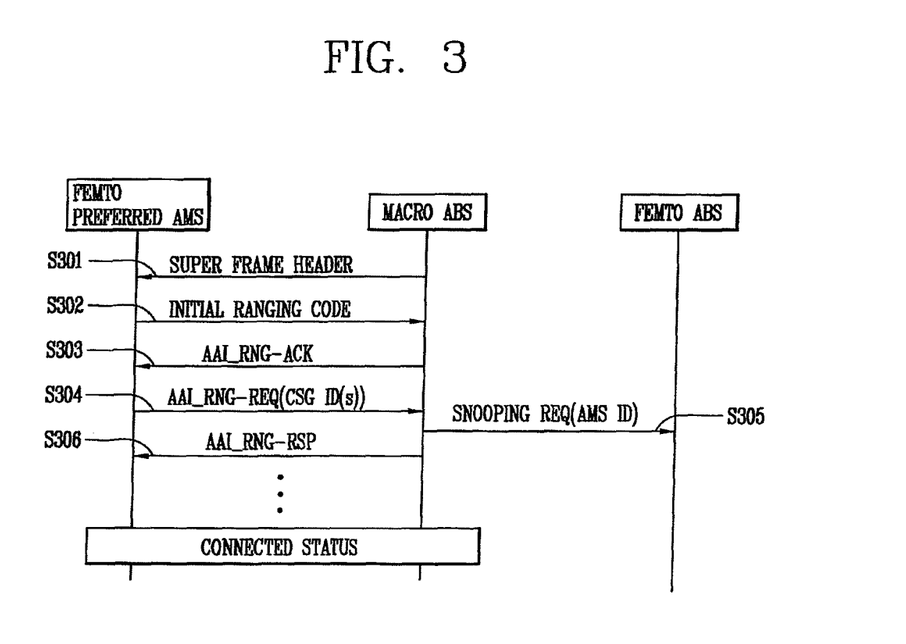
FIG. 3 is a flow chart illustrating the procedure according to a first exemplary embodiment of the present invention.

FIG. 3 is a flow chart illustrating the procedure according to a first exemplary embodiment of the present invention.

First, the terminal performs a network entry process with an overlay macro base station. While performing the network entry process, the terminal and the macro base station exchange information required for the network entry. Here, the overlay macro base station refers to a macro base station whose coverage overlaps with the coverage of a femto base station within the macro base station.

Namely, the terminal receives a superframe header including essential system information from the overlay macro base station in order to communicate with the overlay macro base station (step S301).

Next, the terminal transmits an initial ranging code to the base station (step S302). The overlay macro base station transmits a response (AAI_RNG-ACK) with respect to the initial ranging code to the terminal (step S303).

And then, the terminal transmits a ranging request message (AAI_RNG-REQ message) including the CSG ID(s) information to the overlay macro base station (step S304). Here, the terminal may be a femto preferred AMS. The femto preferred AMS refers to a terminal that prefers to access a femto base station, when it is classified according to its tendency.

Upon receiving the ranging request message including the CSG ID information from the terminal, the macro base station may instruct the femto base station belonging to the CSG ID to perform snooping (step S305). In this case, the overlay macro base station may use a MAC control message, a header, or the like, in order to instruct the femto base station to perform snooping.

Here, the overlay macro base station may selectively recommend a femto base station to monitor uplink signaling of the terminal belonging to the overlay macro base station by using the CSG ID received from the terminal. The femto base station refers to a femto base station that the terminal can access.

When the overlay macro base station selects a femto base station, it may select the femto base station in consideration of location information or base station information reported by the terminal when the location information of the base station information are available to be used.

Here, the selecting of the femto base station by the overlay macro base station is performed before the overlay macro base station recommends the femto base station to monitor the uplink signaling of the terminal.

If no CSG femto base station is selected by the overlay macro base station, the overlay macro base station may not recommend a CSG femto base station for monitoring uplink signaling of the terminal.

Thereafter, the overlay macro base station transmits a ranging response message to the terminal in response to the ranging request message (step S306).

Table 1 below shows an example of a ranging request message (AAI_RNG-REQ message) including the CSG ID(s).

With reference to Table 1, the CSG ID information included in the ranging request message includes an N_CSG_ID_Infos field indicating the number of CSG ID information blocks, a field indicating an operator ID of a CSG femto cell, an N_CSG_IDs field indicating the number of CSG IDs belonging to the operator ID, and a field indicating a CSG ID within the operator ID.

Second Embodiment

A second embodiment provides a method of transmitting CSG ID(s) through an AAI_REG-REQ message while the terminal performs a network entry with the overlay macro base station.

Figure 4:
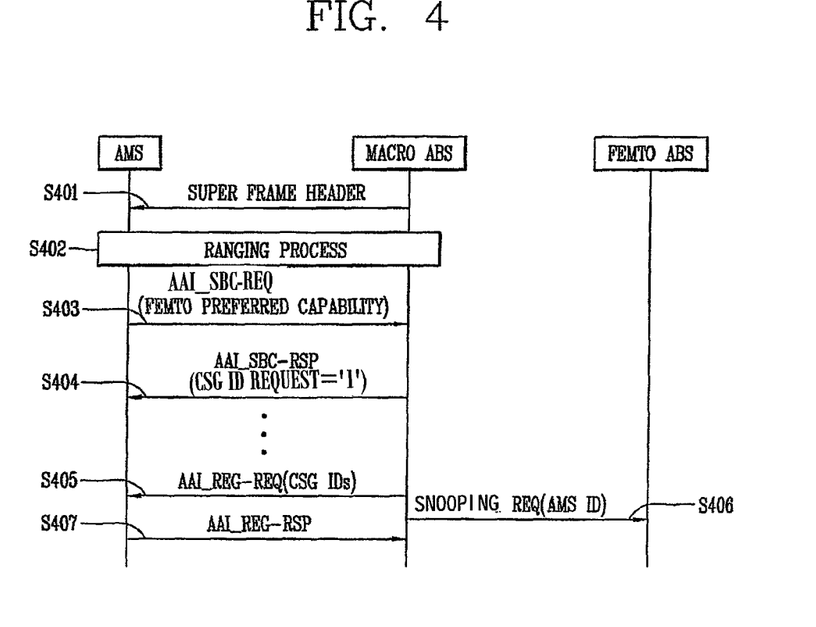
FIG. 4 is a flow chart illustrating the procedure according to a second exemplary embodiment of the present invention.

FIG. 4 is a flow chart illustrating the procedure according to a second exemplary embodiment of the present invention.

Step S401 is the same as step S301, so a description thereof will be omitted.

The terminal performs a ranging procedure with the overlay macro base station in order to perform network entry toward the overlay macro base station (step S402).

Next, the terminal performs a basic capability negotiation process with the overlay macro base station.

Namely, the terminal transmits an SBC (SS Basic Capability)-REQ message including a femto preferred capability parameter indicating whether or not connection to a femto base station is preferred to the overlay macro base station (step S403). For example, when the femto preferred capability parameter is set to 1, it indicates that the terminal prefers a connection to a femto base station.

Upon receiving the SBC-REQ message including the femto preferred capability parameter set to 1 is transmitted, the overlay macro base station transmits an SBC-RSP message including a parameter indicating a transmission of a CSG ID (CSG ID request parameter) to the terminal (step S404).

Here, for example, when the CSG ID request parameter is set to 1, it means that a transmission of the CSG ID to the terminal is indicated.

Upon receiving the SBC-RSP message including the CSG ID request parameter set to 1, the terminal transmits a registration request message (AAI_REG-REQ message) includ-

TABLE 1

| Field | Size (bits) | Value/Description | Condition |
|---|---|---|---|
| ... | ... | ... | ... |
| For(i=0; I<N_CSG_ID_Infos;i++ ){ | | N_CSG_ID_Infos is the number of CSG ID Information blocks. 1≤N_CSG_ID_infos≤15 | Optional for loop. May be included for quick CSG membership detection or ABS reselection assistance |
| Operator ID of the CSG femto cell | | The operator ID of the CSG femto cell | Present if the operator ID is different from the one of the ABS |
| For(j=0;j<N_CSG_IDs; j++){ | | N_CSG_IDs is the number of CSG IDs belongs to this operator ID. | |
| CSGID | | The CSGID within the operator ID. It may be part of the BS ID, with certain bits inside indicating its length. If the CSG has single BS, it may be of maximum length which is the LBS-24-bits of the full BS ID | | ing the CSG ID(s) information stored in a CSG white list stored in the terminal to the overlay macro base station (step S405).

Thereafter, the overlay macro base station transmits an indication message for recommending femto base stations belonging to the CSG ID received from the terminal to monitor uplink signaling of the terminal, namely, a message instructing to start snooping, to the femto base stations (step S406).

The terminal may receive a registration response message from the overlay macro base station, as a response message with respect to the registration request message (step S407).

Table 2 below shows an example of the SBC-REQ message format including the femto preferred capability parameter.

TABLE 2

| M/O | Attributes/ Array of attributes | Size (bits) | Value/Note | Conditions |
|---|---|---|---|---|
| M | Femto preferred capability | 1 | 1: femto preferred 0: femto not preferred | |

Table 3 below shows an example of the SBC-RSP message format including the CSG ID requested parameter

TABLE 3

| M/O | Attributes/ Array of attributes | Size (bits) | Value/Note | Conditions |
|---|---|---|---|---|
| M | CSGID requested | 1 | 1: CSG ID requested 0: CSG ID not requested | If 'femto preferred capability' is set to 1, ABS should include this parameter in AAI_SBC-RSP. |

Table 4 below shows an example of the REG-REQ message format including the list of CSG IDs.

TABLE 4

| M/O | Attributes/ Array of attributes | Size (bits) | Value/Note | Conditions |
|---|---|---|---|---|
| M | List of CSGIDs | 1 | List of CSGIDs which the AMS is subscribed to | |

Third Embodiment

A third embodiment provides a method of transmitting the CSG ID(s) through an SNP-IND message, after the terminal performs the network entry with the overlay macro base station.

Figure 5:
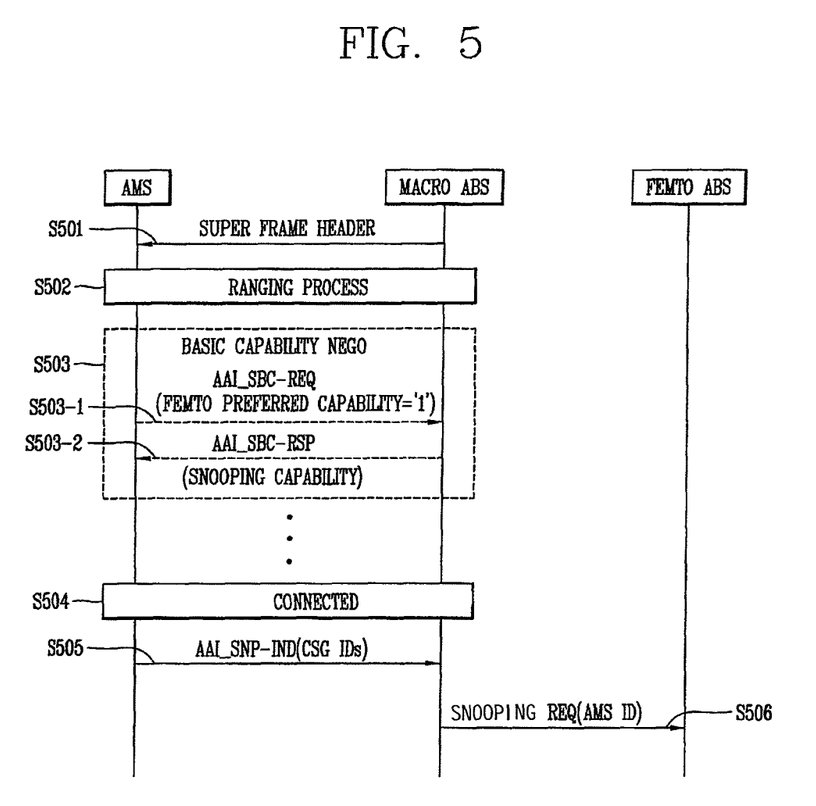
FIG. 5 is a flow chart illustrating the procedure according to a third exemplary embodiment of the present invention.

FIG. 5 is a flow chart illustrating the procedure according to a third exemplary embodiment of the present invention.

Steps S501 and S502 are the same as steps S401 and S402, so only the difference therebetween will be described.

The terminal performs a basic capability negotiation process with the overlay macro base station (step S503).

In the capability negotiation process, when the terminal sets the femto preferred capability parameter as 1 and transmits an SBC-REQ message to the overlay macro base station (step S503-1), the overlay macro base station transmits an SBC-RSP message including a snooping capability parameter indicating whether or not snooping capability is supported to the terminal (step S503-2).

Namely, in the process of basic capability negotiation, the overlay macro base station may inform the terminal whether or not the overlay macro base station supports snooping through an SBC REQ/RSP message.

Also, the snooping capability parameter indicating whether or not the snooping capability is supported may be transmitted to the terminal through a registration response message (AAI_REG-RSP message).

Next, when the terminal checks that the overlay macro base station supports the snooping capability, the terminal performs a network entry toward the overlay macro base station (step S504) and then transmits a snooping indication message (AAI_SNP-IND message) including the CSG ID(s) information to the overlay macro base station (step S505).

Thereafter, the overlay macro base station transmits an indication message recommending femto base stations belonging to the CSG IDs received from the terminal to monitor uplink signaling of the terminal, namely, a message indicating the start of snooping (step S506).

Table 5 below shows an example of the SBC-RSP message format including the snooping capability parameter

TABLE 5

| M/O | Attributes/ Array of attributes | Size (bits) | Value/Note | Conditions |
|---|---|---|---|---|
| M | Snooping capability | 1 | 1: snooping capability supported 0: snooping capability not supported | If 'femto preferred capability' is set to 1, ABS may include this |

With reference to Table 5, for example, when the snooping capability parameter is set to 1, it indicates that the overlay macro base station supports the snooping capability, and when the snooping capability parameter is set to 0, it indicates that the overlay macro base station does not support the snooping capability. Also, the snooping capability parameter is included in the SBC-RSP message when the femto preferred parameter included in the SBC-REQ message transmitted by the terminal is set to 1.

Table 6 below shows an example of the SNP-IND message format including the CSG ID(s) information.

TABLE 6

| M/O | Attributes/ Array of attributes | Size (bits) | Value/Note | Conditions |
|---|---|---|---|---|
| M | List of CSGIDs | 1 | CSGIDs | If 'snooping capability' is set to 1, AMS may send AAI_SNP-IND including this parameter. |

Fourth Embodiment

A fourth embodiment provides a method of transmitting a CSGID to the terminal through an AAI_SNP-REQ message in order to recognize a target femto base station to indicate snooping by the overlay macro base station.

Figure 6:
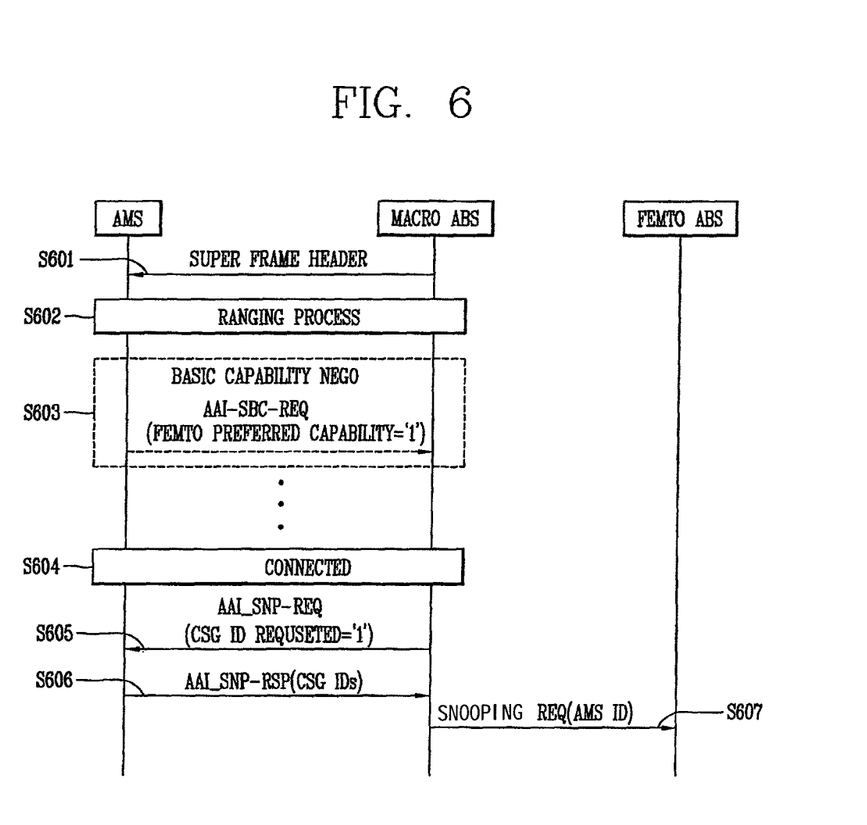
FIG. 6 is a flow chart illustrating the procedure according to a fourth exemplary embodiment of the present invention.

FIG. 6 is a flow chart illustrating the procedure according to a fourth exemplary embodiment of the present invention.

Steps S601 and S602 are the same as steps S501 and S502, so a description thereof will be omitted.

The terminal informs the overlay macro base station performing a network entry that the terminal is a femto preferred terminal through an SBD-REQ message or an REG-REQ message (step S603). Namely, the terminal sets the parameter indicating that the terminal is a femto preferred terminal, as 1, includes it in the SBC-REQ message or the REG-REQ message, and transmits the same to the overlay macro base station.

Thereafter, when the overlay macro base station and the terminal successfully finish the network entry (S604), the overlay macro base station transmits an SNP-REQ message including the CSG ID request parameter to the terminal (step 605). Upon receiving the SNP-REQ message, the terminal transmits the CSG ID information of the femto base stations to which the terminal belongs to the overlay macro base station, while responding with the SNP-RSP message (step S606).

Thereafter, the overlay macro base station instructs the femto base stations corresponding to the CSG ID information to monitor uplink signaling of the terminal (step S607).

Table 7 below shows an example of the SNP-REQ message including a CSG ID requested parameter.

TABLE 7

| M/O | Attributes/ Array of attributes | Size (bits) | Value/Note | Conditions |
|---|---|---|---|---|
| M | CSGID requested | 1 | 1: CSG ID requested 0: CSG ID not requested | |

Table 8 below shows an example of the SNP-RSP message format including the CSG ID(s) information.

| M/O | Attributes/ Array of attributes | Size (bits) | Value/Note | Conditions |
|---|---|---|---|---|
| M | List of CSGIDs | 1 | CSGIDs | If 'CSGID requested' is set to 1, AMS should reply with AAI_SNP-RSP including this parameter. |

Figure 7:
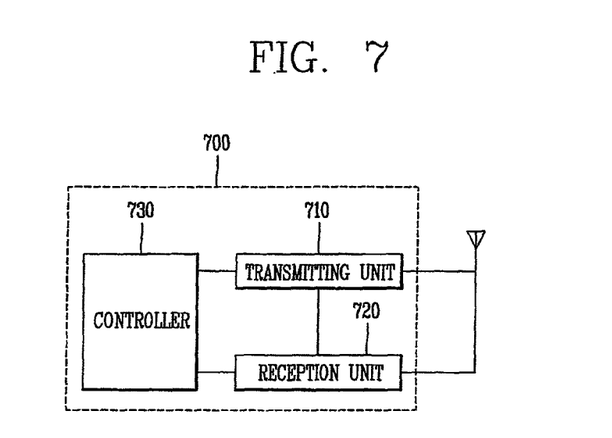
FIG. 7 is a schematic block diagram of a base station according to an exemplary embodiment of the present invention.

FIG. 7 is a schematic block diagram of a base station according to an exemplary embodiment of the present invention.

First, a base station 700 includes a transmission unit 710, a reception unit 720, and a controller 730.

Here, the base station refers to an overlay macro base station whose coverage overlaps with that of a femto cell existing within the area of the base station. Also, the femto cell may be a CSG femto cell within the overlay macro base station.

The transmission unit 710 transmits identification information of the terminal to the femto cell so that the femto cell can monitor uplink signaling of the CSG terminal belonging to the overlay macro base station. Here, the terminal may be a femto preferred terminal preferentially attempting a network entry toward the femto cell.

The reception unit 720 receives a ranging request message including CSG ID information from the terminal that attempts the network entry.

The controller 730 selects at least one femto cell that can be accessed by the CSG terminal on the basis of the CSG identification information received from the terminal, and controls the transmission unit 710 to transmit identification information of the terminal to the selected femto cell. Here, the selected femto cell may be a femto cell located near the terminal.

Also, when no femto cell is selected, the controller 730 may not recommend to monitor uplink signaling of the CSG terminal belonging to the overlay macro base station.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for operating an overlay macro base station for supporting a terminal to perform a handover between the overlay macro base station and a closed subscriber group (CSG) femto base station, the method comprising:
receiving, by the overlay macro base station, a ranging request message including a CSG identifier from a terminal belonging to the CSG which performs a network entry with the overlay macro base station;
receiving, by the overlay macro base station, a capability request message which includes a femto preferred capability parameter from the terminal, the femto preferred capability parameter indicating whether or not a connection to the CSG femto base station is preferred;
transmitting, by the overlay macro base station, a response message in response to the capability request message to the terminal, the response message including an indication that a snooping capability is supported; and
after receiving the ranging request message from the terminal, signaling, by the overlay macro base station to the CSG femto base station during the network entry, to activate the snooping capability to monitor uplink signaling of the terminal belonging to the CSG.

2. The method of claim 1, further comprising:
selecting the CSG femto base station based on location information or base station information reported by the terminal.

3. The method of claim 2, wherein the selected CSG femto base station is a CSG femto base station located near the terminal.

4. The method of claim 2, wherein the recommendation to monitor the uplink signaling of the terminal belonging to the CSG is signaled to the selected CSG femto base station.

5. The method of claim 2, wherein, when no CSG femto base station has been selected, the recommendation to monitor the uplink signaling of the terminal belonging to the CSG is not signaled.

6. The method of claim 1, wherein, in the signaling the recommendation to monitor the uplink signaling of the terminal belonging to the CSG, information for identifying the terminal to be monitored by the CSG femto base station is transmitted to the CSG femto base station.

7. The method of claim 1, wherein the CSG femto base station is a CSG femto base station within the overlay macro base station.

8. The method of claim 1, wherein the terminal is a femto preference terminal which preferentially performs the network entry with the CSG femto base station.

9. The method of claim 1, further comprising:
transmitting a scan response message to the terminal, the scan response message including a list of neighbor femto base stations thereby to be scanned by the terminal,
wherein at least one neighbor femto base station in the list belongs to the CSG and is selected by the overlay macro base station as being accessible by the terminal.

10. An overlay macro base station for supporting a terminal to perform a handover between the overlay macro base station and a femto base station, the overlay macro base station comprising:
a reception unit configured to receive a ranging request message including a closed subscriber group (CSG) identifier, and a capability request message which includes a femto referred capability parameter indicating whether or not a connection to the femto base station is preferred, from a terminal belonging to the CSG that performs a network entry with the overlay macro base station;
a controller cooperatively connected with the reception unit and configured to select at least one CSG femto base station to which the terminal is accessible; and
a transmission unit controlled by the controller and configured to:
transmit a response message in response to the capability request message, the response message including an indication that a snooping capability is supported; and
signal, to the selected at least one CSG femto base station during the network entry, to activate the snooping capability to monitor uplink signaling of the terminal belonging to the CSG.

11. The overlay macro base station of claim 10, wherein the terminal is a femto preference terminal which preferentially performs the network entry with the selected at least one CSG femto base station.

12. The overlay macro base station of claim 10, wherein the selected at least one CSG femto base station is a CSG femto base station located near the terminal.

13. The overlay macro base station of claim 10, wherein the selected at least one CSG femto base station is a CSG femto base station within the overlay macro base station.

14. The overlay macro base station of claim 10,
wherein the transmission unit is further configured to transmit a scan response message to the terminal, the scan response message including a list of neighbor femto base stations thereby to be scanned by the terminal, and
wherein at least one neighbor femto base station in the list belongs to the CSG and is selected by the overlay macro base station as being accessible by the terminal.

* * * * *